United States Patent
Hafner

(10) Patent No.: US 11,355,925 B2
(45) Date of Patent: Jun. 7, 2022

(54) SYSTEM DESIGN SOLUTION FOR DC GRID COST REDUCTION AND RISK MINIMIZATION

(71) Applicant: Hitachi Energy Switzerland AG, Baden (CH)

(72) Inventor: Ying-Jiang Hafner, Ludvika (SE)

(73) Assignee: HITACHI ENERGY SWITZERLAND AG, Baden (CH)

( * ) Notice: Subject to any disclaimer, the term of this patent is extended or adjusted under 35 U.S.C. 154(b) by 6 days.

(21) Appl. No.: 16/966,376

(22) PCT Filed: Jun. 1, 2018

(86) PCT No.: PCT/EP2018/064428
§ 371 (c)(1),
(2) Date: Jul. 30, 2020

(87) PCT Pub. No.: WO2019/149385
PCT Pub. Date: Aug. 8, 2019

(65) Prior Publication Data
US 2020/0373755 A1    Nov. 26, 2020

(30) Foreign Application Priority Data

Jan. 30, 2018 (SE) .................... 1850107-2

(51) Int. Cl.
*H02H 9/04* (2006.01)
*H02J 3/00* (2006.01)
*H02J 3/36* (2006.01)
*H02M 5/458* (2006.01)

(52) U.S. Cl.
CPC ............... *H02H 9/04* (2013.01); *H02J 3/001* (2020.01); *H02J 3/36* (2013.01); *H02M 5/4585* (2013.01)

(58) Field of Classification Search
CPC .. H02H 9/04; H02J 3/001; H02J 3/36; H02M 5/4585
USPC ........................................................... 363/35
See application file for complete search history.

(56) References Cited

U.S. PATENT DOCUMENTS

| | | |
|---|---|---|
| 4,340,921 A | 7/1982 | Lasseter |
| 8,098,504 B2 | 1/2012 | Karlsson et al. |
| 2009/0168473 A1* | 7/2009 | Karlsson ................... H02J 3/38 363/68 |

(Continued)

FOREIGN PATENT DOCUMENTS

| | | |
|---|---|---|
| CN | 101297456 A | 10/2008 |
| CN | 103181048 A | 6/2013 |

(Continued)

*Primary Examiner* — Yemane Mehari
(74) *Attorney, Agent, or Firm* — Slater Matsil, LLP

(57) ABSTRACT

A neutral arrangement is provided for a converter station of a direct current power transmission system that includes a first converter. The neutral arrangement includes surge arrestors and a group of neutral buses. Each surge arrestor is connected between a neutral bus and ground. The neutral arrangement includes a high voltage insulation zoom area having a first group of surge arrestors and a low voltage insulation zoom area having a second group of surge arrestors. The surge arrestors in the first group have a first arrestor reference voltage and the surge arrestors in the second group have a second arrestor reference voltage that is lower than the first arrestor reference voltage.

21 Claims, 6 Drawing Sheets

(56) References Cited

U.S. PATENT DOCUMENTS

| | | | |
|---|---|---|---|
| 2009/0201702 A1* | 8/2009 | Radbrant | H02J 3/36 363/35 |
| 2009/0219737 A1* | 9/2009 | Bjorklund | H02J 3/36 363/35 |
| 2013/0229739 A1* | 9/2013 | Juhlin | H02M 1/32 361/86 |
| 2014/0247629 A1* | 9/2014 | Crane | H02M 1/08 363/35 |
| 2018/0166881 A1* | 6/2018 | Suryanarayana | H02J 3/383 |

FOREIGN PATENT DOCUMENTS

| | | |
|---|---|---|
| CN | 106451523 A | 2/2017 |
| EP | 2633597 A1 | 9/2013 |

* cited by examiner

SYSTEM DESIGN SOLUTION FOR DC GRID COST REDUCTION AND RISK MINIMIZATION

CROSS-REFERENCE TO RELATED APPLICATIONS

This application is a national phase application of International Application No. PCT/EP2018/064428, filed on Jun. 1, 2018, which application claims priority to Sweden Patent Application No. 1850107-2, filed on Jan. 30, 2018, which applications are hereby incorporated herein by reference.

FIELD OF INVENTION

The present invention generally relates to high voltage equipment. More particularly the present invention relates to a neutral arrangement, a converter station and a direct current power transmission system comprising such a neutral arrangement.

BACKGROUND

It has in some situations become of interest to use a multi-terminal High Voltage Direct Current (HVDC) system, based on bipolar Modular Multilevel Converters (MMCs) with a number of Direct Current (DC) power loops which becomes a truly meshed DC grid.

One exemplifying system is a 4-terminal system or grid comprising 2 sending stations, 1 receiving station and 1 adjusted station. Differing from other existing multi-terminal HVDC, the above-mentioned system is thus based on bipolar MMC converter configuration and it will formulate a number of DC power loops which becomes a truly meshed DC grid. Thus, it will have historic significance for the future DC grid and it will also face new challenges.

In a bipolar HVDC system with modular multilevel converter (MMC), one of the possible critical faults is failure of a wall bushing between the converter and an arm reactor, which leads to a converter bus passing through such a wall bushing being short-circuited to ground, thus causing a ground fault. If surge arrestors on the DC side of a converter neutral bus are not designed with sufficient high voltage, a short-circuit current loop may be formulated via a converter valve. Due to lack of inductance in the loop, the valve current may rise to a destructively high level within a short period of time of for instance less than 100 μs. In general any arm current protection arrangement would not be able to handle this fault case unless the valve has self-protective capability by internal gate-unit protection. Even if some valves have self-protective capability by internal gate-unit protection, they can not solve the basic problem because multiple vendors may be involved where only some may offer self-protective capability.

One way to avoid this destructively high fault current is to increase the insulation level on the neutral bus. For an exemplifying system with 535 kV rated pole voltage, the neutral bus insulation (normally measured by SIPL—Switching Impulse Level) may have to be designed above 500 kV, which is higher than the neutral bus SIPL in +/−800 kV classic HVDC systems.

As a consequence, the insulation level for all equipment on the neutral bus will be high, which will lead to not only high costs for the equipment on the neutral bus and line, but also increased voltage stress on the pole bus/line. The pole to ground voltage is coupled to the neutral bus/line to ground voltage, which is defined by the grounding in the receiving station.

Furthermore, an increase of the insulation level may significantly increase the potential risk of failing to handle faults considering that the neutral line voltage under normal operation may be near zero or below 10 kV in the worst case monopole operation, but it can rise above 500 kV during transients.

There is thus a need for alternative means of handling fault currents.

SUMMARY

Aspects of the invention are directed towards solving one or more of the above-mentioned problems. Aspects of the invention are more particularly directed towards handling such a fault current on an AC connection of a converter.

This is according to a first aspect done through a neutral arrangement for a converter station of a direct current power transmission system comprising a first converter, where the neutral arrangement comprises surge arrestors and a group of neutral buses, where each surge arrestor is connected between a neutral bus of the group and ground, wherein a first insulation area of the neutral arrangement is a high voltage insulation zoom area comprising a first group of surge arrestors and a second insulation area of the neutral arrangement is a low voltage insulation zoom area comprising a second group of surge arrestors, wherein the surge arrestors in the first group have a higher arrestor reference voltage than the surge arrestors in the second group.

The fault handling is according to a second aspect achieved through a converter station for a direct current power transmission system comprising a first converter and the neutral arrangement according to the first aspect.

The fault handling is according to a third aspect achieved through a direct current power transmission system comprising a converter station according to the second aspect, where the direct current power transmission system may be a multi-terminal power transmission system or a point to point transmission system.

In a first variation of the first aspect, the group of neutral buses comprises a first neutral bus connected to the first converter and the surge arrestors in the first group comprise surge arrestors connected to the first neutral bus. In this case at least one surge arrestor of the second group may also be connected to the first neutral bus.

In a second variation of the first aspect the first insulation area is separated from the second insulation area of the neutral arrangement via a reactor in the first neutral bus.

In a further variation of the first aspect, the reference voltage of the first group of surge arrestors defines a discharge voltage that is at least two times higher, with advantage at least three times higher and preferably five times higher than the reference voltage of the second group of surge arrestors. It is in this case possible that the arrestor reference voltage defines a discharge voltage, such as the Switching Impulse Level (SIPL) reference voltage.

The direct current power transmission system may be a bipolar direct current power transmission system and in which the converter station comprises a second converter connected to a second pole of the direct current power transmission system.

In a further variation of the first aspect, the group of neutral buses may then comprise a second neutral bus connected to the second converter and the first group of surge arrestors may comprise surge arrestors connected between the second neutral bus and ground. At least one surge arrestor of the second group may also be connected to the second neutral bus.

In yet another variation of the first aspect the first insulation area is separated from the second insulation area via a second reactor in the second neutral bus.

In yet another variation of the first aspect, the group of neutral buses comprises a common neutral bus that is connected to both the first and second neutral buses and at least some surge arrestors of the second group are connected to the common neutral bus.

The neutral arrangement may furthermore comprise at least one earth switch in the low voltage insulation zoom area.

The invention has a number of advantages, through the division of the neutral arrangement into a high voltage zoom area and a low voltage zoom area it is possible to better handle faults with an increase in rating limited to the high voltage zoom area. Thereby the reactors as well as components in the low voltage zoom area can be kept smaller. The invention also avoids an increased voltage stress on the pole bus/line as well as allows fault handling.

BRIEF DESCRIPTION OF DRAWINGS

The invention will in the following be described with reference being made to the accompanying drawings, where.

DETAILED DESCRIPTION

The invention is concerned with a converter station for a Direct Current (DC) power transmission system as well as to a neutral arrangement in such a converter station.

Figure 1:
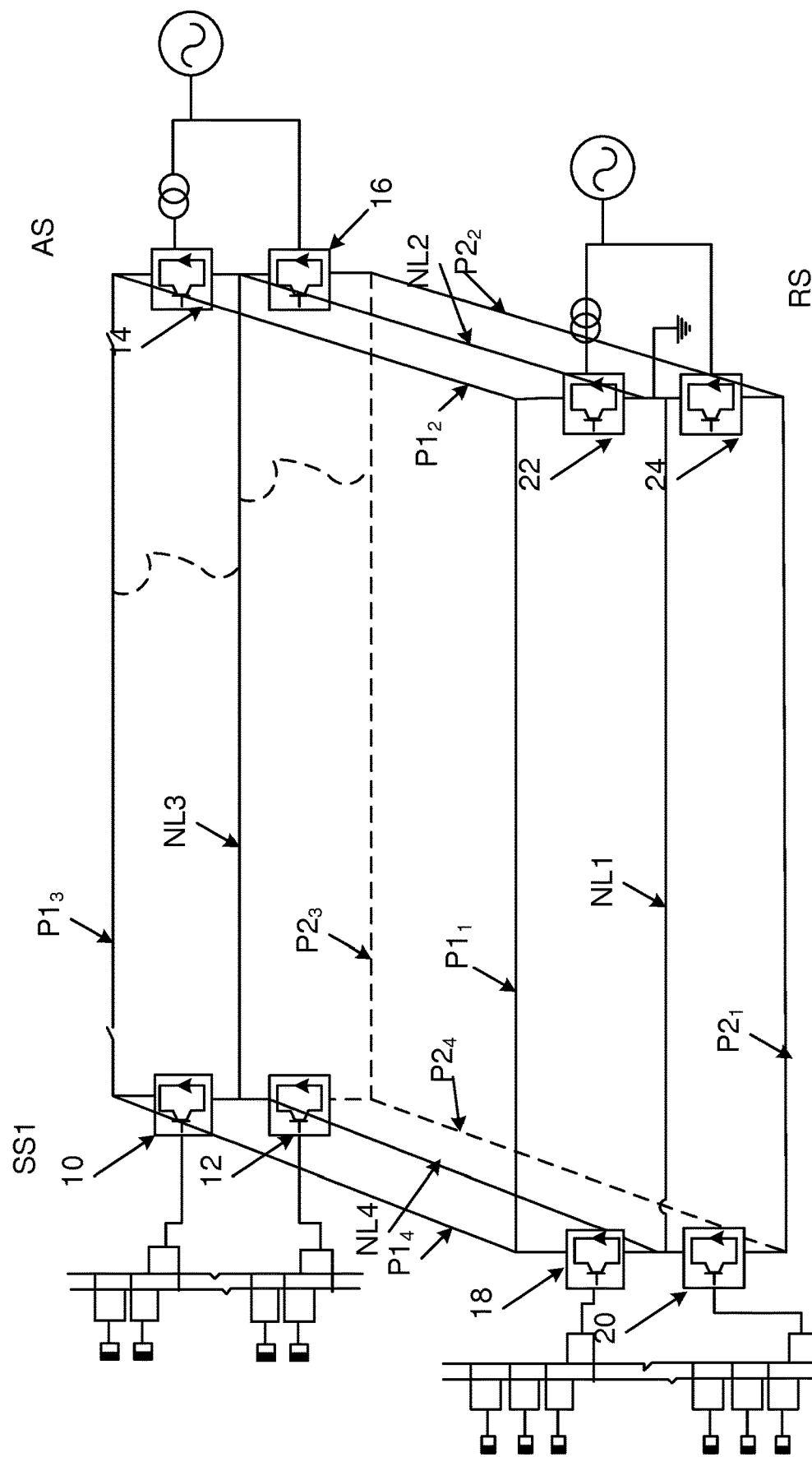
FIG. 1 shows a simplified bipolar system configuration, showing grounding point of DC side at the receiving converter station.

A DC power transmission system in which the converter with the neutral arrangement may be provided is schematically shown in FIG. 1.

The converter system is in one example a multi-terminal High Voltage Direct Current (HVDC) system, based on bipolar Modular Multilevel Converters (MMCs) with a number of Direct Current (DC) power loops which becomes a truly meshed DC grid.

In FIG. 1 a first converter 10 of a first sending station SS1 is connected to a first converter 14 of an adjusted station AS via a first pole $P1_3$ and a second converter 12 of the first sending station SS1 is connected to a second converter 16 of the adjusted station AS via a second pole $P2_3$, where a neutral line NL3 interconnects a junction between the first and second converters 10 and 12 of the first sending station SS1 with a junction between the first and second converters 14 and 16 of the adjusted station AS.

In a similar manner a first converter 18 of a second sending station SS12 comprises a first converter 18 connected to a first converter 22 of a receiving station RS via a first pole $P1_1$ and a second converter 20 of the second sending station SS2 is connected to a second converter 24 of the receiving station RS via a second pole $P2_1$, where a neutral line NL1 interconnects a junction between the first and second converters 18 and 20 of the second sending station SS2 with a junction between the first and second converters 22 and 24 of the receiving station RS.

Moreover, the first converter 10 of the first sending station SS1 is connected to the first converter 18 of the second sending station SS2 via another first pole $P1_4$, the second converter 12 of the first sending station SS1 is connected to the second converter 20 of the second sending station SS2 via a second pole $P2_4$ and a neutral line NL4 interconnects a junction between the first and second converters 10 and 12 of the first sending station SS1 with a junction between the first and second converters 18 and 20 of the second sending station SS2.

Finally the first converter 14 of the adjusted station AS is connected to the first converter 22 of the receiving station RS via a first pole $P1_2$ and the second converter 16 of the adjusted station AS is connected to the second converter 24 of the receiving station RS via a second pole $P2_2$, where a neutral NL2 interconnects a junction between the first and second converters 14 and 16 of the adjusted station AS with a junction between the first and second converters 22 and 24 of the receiving station RS.

Here it may be mentioned that it is possible to extend the system to for instance 6 or more stations, such as 7 stations. Differing from other existing multi-terminal HVDC, the above-mentioned system is based on bipolar MMC converter configuration and it will formulate a number of DC power loops which becomes a truly meshed DC grid.

Figure 2:
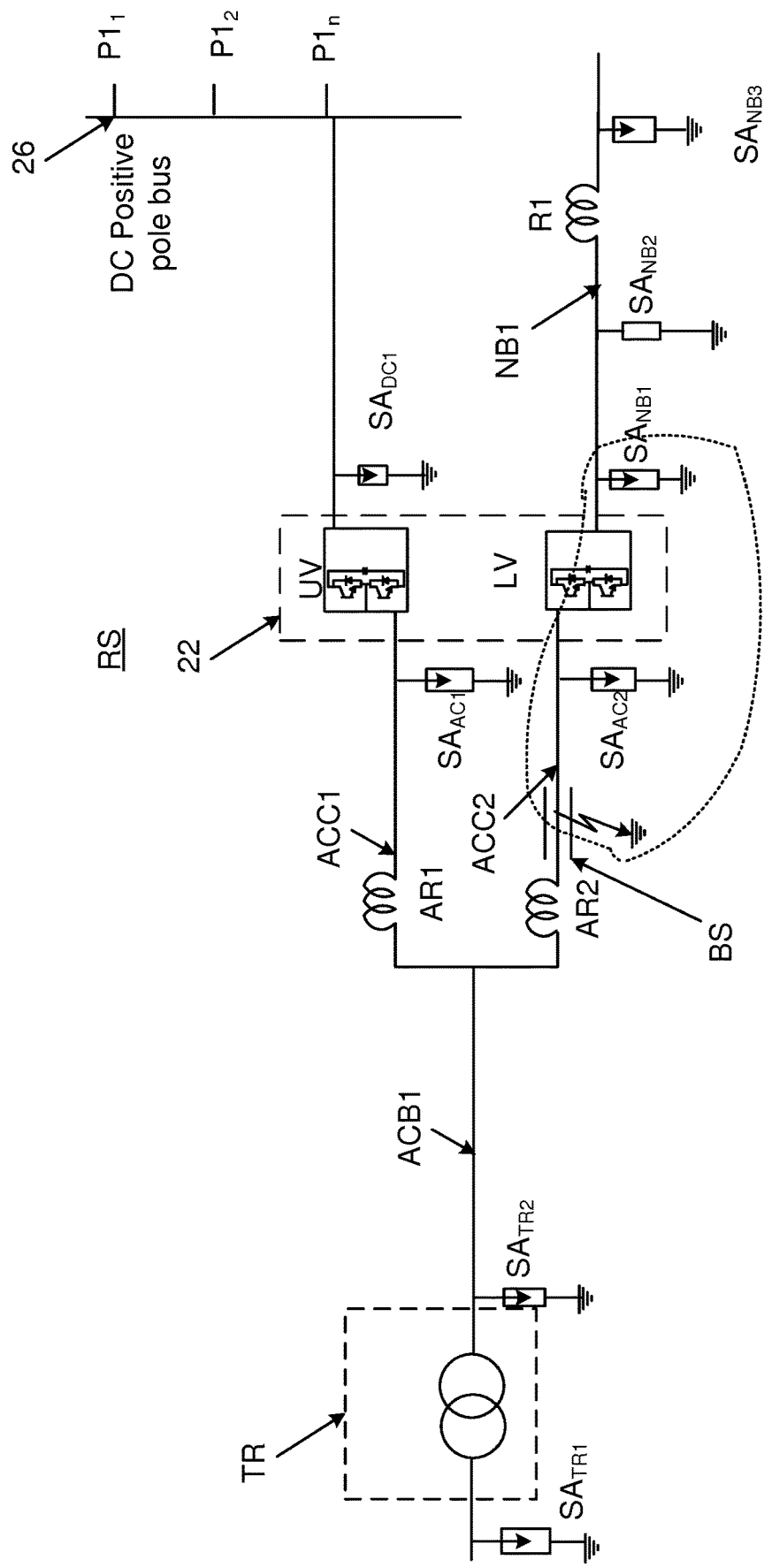
FIG. 2 shows possible fault and fault current loop in a converter station.

A conventional converter station, such as the receiving converter station RS, may be realized in the way shown in FIG. 2, which shows how the first converter 22 is connected. The second converter has here been omitted, but it is connected in the same way as the first converter 22. It can be seen that the first converter 22 comprises an upper valve group UV and a lower valve group LV, both realized through cascaded submodules. The upper valve group UV of the first converter 22 is on the DC side connected to a positive DC pole bus 26, to which DC pole bus 26 the first poles $P1_1$, $P1_2$ and $P_n$ leading to the other converters are connected. In the given example the first poles $P1_1$ and $P1_2$ leading to the second sending station and the adjusted station are used.

The lower valve group LV is on the DC side connected to a first neutral bus NB1 that connects to the neutral lines leading to the connected stations (not shown) via a first neutral bus reactor R1.

In the AC of the first converter there are three phases. For each phase, the AC side of the upper valve group UV is connected to a first arm reactor AR1 via a first AC connection ACC1, which first arm reactor AR1 is in turn connected to a first internal AC bus ACB1. For each phase, the AC side of the lower valve group LV is connected to a second arm reactor AR2 via a second AC connection ACC2, which second arm reactor AR2 is in turn also connected to the first internal AC bus ACB1. The internal AC bus ACB1 is also connected to a first end of a first transformer TR1, the second end of which may be connected to an AC system (not shown) although more connections are possible. It should here be realized that as an alternative the arm reactors may be placed on the DC side of the converter.

It can be seen that the upper converter valve group UV has a first DC side surge arrestor $SA_{DC1}$ connected between pole and ground and that the neutral bus has NB1 has three surge arrestors $SA_{NB1}$, $SA_{NB2}$ and $SA_{NB3}$ connected between the first neutral bus NB1 and ground, where a first and a second surge arrestor $SA_{NB1}$ and $SA_{NB2}$ are connected to the first neutral bus NB1 between the first neutral reactor R1 and the lower valve group LV, while a third surge arrestor $SA_{NB3}$ is connected to the first neutral bus NB1 after the first neutral reactor R1, i.e. between the first neutral reactor R1 and the neutral lines leading to the connected converter stations.

It can also be seen that a first AC side surge arrestor $SA_{AC1}$ is connected between the first AC connection ACC1 and ground and a second AC side surge arrestor $SA_{AC2}$ is connected between the second AC connection ACC2 and ground, where the first AC side surge arrestor $SA_{AC1}$ is connected between the upper valve group UV and the first AC arm reactor AR1, while the second AC side surge arrestor $SA_{AC2}$ is connected between the lower valve group LV and the second arm reactor AR2. It can also be seen that on both sides of the first transformer TR1 there are surge arrestors $SA_{TR1}$ and $SA_{TR2}$ connected to ground. Also here the above-mentioned surge arrestors are provided for three phases.

The second AC connection ACC2 and perhaps also the first AC connection in this case pass through a wall bushing, i.e. a bushing in the wall of an enclosure of the valve. Such an enclosure may be an enclosure of the converter and may be in the form of a so-called valve hall. Such a bushing BS is schematically indicated around the second AC connection ACC2 between the lower valve group LV and the second arm reactor AR2.

An MMC valve typically comprises submodules with switches in parallel with a capacitor as is indicated by the used valve symbol. These switches are operated using gate control units, where the main purpose of such a gate control unit is to adjust the voltage level of logic signals used to operate a switch. A gate control unit may additionally comprise some self-protection capabilities with regard to fault current handling.

Figure 3:
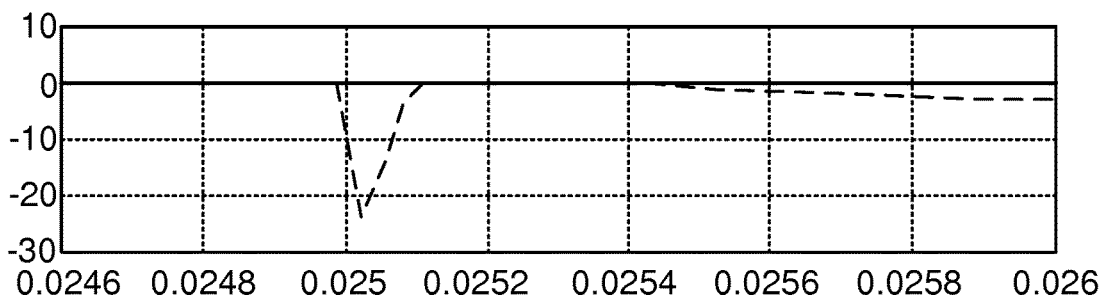
FIG. 3 shows an example of a possible fault current.

In FIG. 2 a ground fault is also indicated for a fault at the second AC connection ACC2 passing through the bushing BS and FIG. 3 shows an example fault current (dashed line) for this fault.

In a bipolar HVDC system with modular multilevel converter (MMC), one of the possible critical faults is the failure of the wall bushing BS, which leads to the AC connection being short-circuited to ground, thereby causing a ground fault. If the arrestors on the DC side of the converter neutral bus $SA_{NB1}$, $SA_{NB2}$ and $SA_{NB3}$ are not designed with sufficient high voltage, a short-circuit current loop may be formulated via converter valve group LV as shown in FIG. 2, which fault current is shown with the dashed curve in FIG. 3. Due to lack of inductance in the loop, the valve current may rise to a destructively high level within a short period of time of less than 100 μs. One possible way to avoid this destructive high fault current is to implement valve internal short-circuit protection functionality, which functionality is integrated in a valve switch gate control unit, which requires advanced gate control unit as well as extra feature for semiconductor components. The arm current protection provided through the second AC side surge arrestor $SA_{AC2}$ is hardly able to handle this fault case unless the valve has self-protective capability by internal gate-unit protection. Moreover, even if some valves have the self-protective capability by internal gate-unit protection, they can not solve the basic problem because multiple vendors may be involved where only some offer self-protective capability.

Another way to avoid this destructively high fault current is to increase the insulation level on the neutral bus NB1. For an exemplifying system with 535 kV rated pole voltage, the neutral bus insulation (normally measured by SIPL—Switching Impulse Level) may have to be designed above 500 kV, which is higher than the neutral bus SIPL in +/−800 kV classic HVDC system. In the case that the valve has no advanced internal short-circuit protection, this may be the only way to avoid destructive short circuit current.

As a consequence of increasing the neutral bus insulation level, the insulation level for all equipment on neutral bus NB1 will be high, which will lead to not only high cost for equipment on neutral bus and line, but also increased voltage stress on the pole bus/line. As shown in FIG. 1, the pole to ground voltage is coupled to the neutral bus/line to ground voltage, which is defined by the grounding in the receiving station.

Furthermore, an increase of the insulation level may significantly increase the potential risk of failing to handle faults considering that neutral line voltage under normal operation may be near zero or below 10 kV in the worst case monopole operation, but it can rise above 500 kV during transients.

There is thus a need for an alternative in the avoiding of fault currents on an AC connection of a converter in such a system, which alternative improves the above mentioned approach of increasing the neutral bus insulation level. This alternative is provided through the neutral arrangement of the converter.

Figure 4:
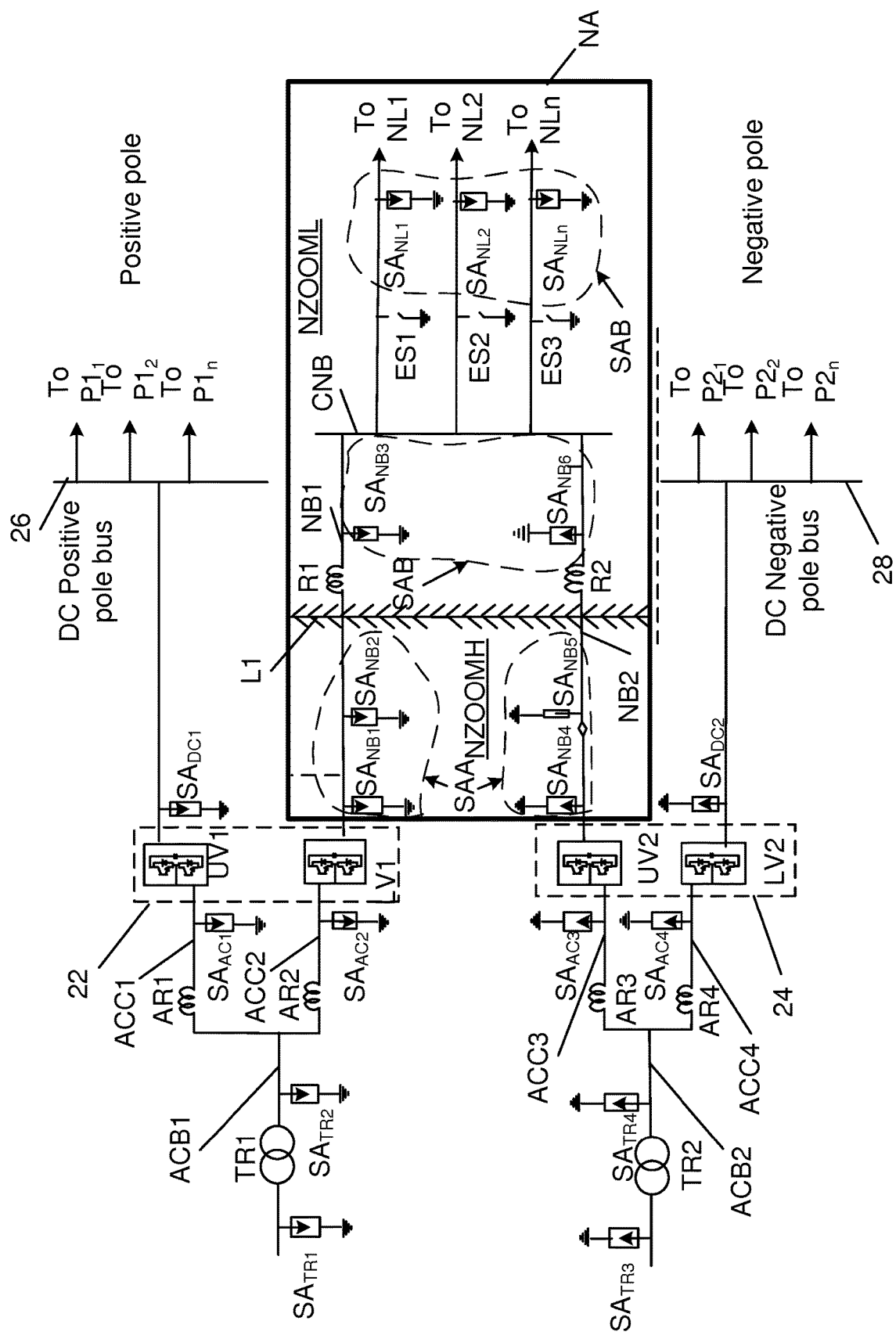
FIG. 4 shows the converter station with a separation of the neutral into high voltage and low voltage zooms.
Figure 5:
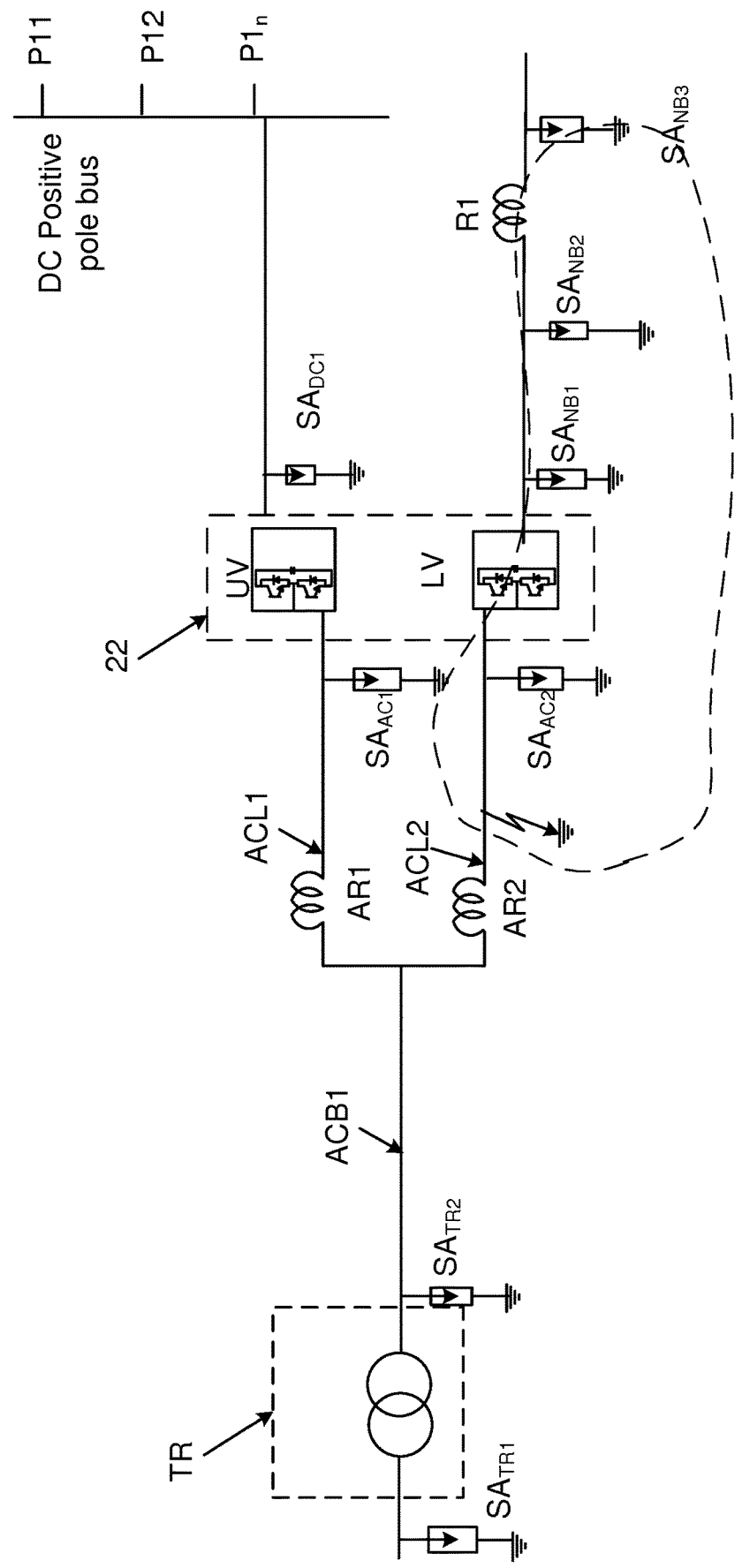
FIG. 5 shows a possible fault and fault current loop in the converter station.

As can be seen in FIG. 4, a converter station, such as the receiving station RS, may comprise a first converter 22 and a second converter 24 connected in series between two poles.

It can be seen that the first converter 22 comprises an upper valve group UV1 and a lower valve group LV1, both realized through cascaded submodules. The upper valve group UV1 of the converter 22 is on the DC side connected to a positive DC pole bus 26, to which DC pole bus 26 the first poles $P1_1$, $P1_2$ and $P1_n$ leading to the other converters are connected. In the given example only the poles $P1_1$ and $P1_2$ leading to the second sending station and the adjusted station are used although it is possible with n different connections.

As was mentioned earlier the AC side has three phases. For each phase, the AC side of the upper valve group UV1 is connected to a first arm reactor AR1 via a first AC connection ACC1, which first arm reactor AR1 is in turn connected to a first internal AC bus ACB1. The AC side of the lower valve group LV1 is connected to a second arm reactor AR2 via a second AC connection ACC2, which second arm reactor AR2 is in turn also connected to the first internal AC bus ACB1.

It can also be seen that, for each phase, a first AC side surge arrestor $SA_{AC1}$ is connected between the first AC connection ACC1 and ground and a second AC side surge arrestor $SA_{AC2}$ is connected between the second AC connection ACC2 and ground, where the first AC side surge arrestor $SA_{AC1}$ is connected between the upper valve group UV and the first AC arm reactor AR1, while the second AC side surge arrestor $SA_{AC2}$ is connected between the lower valve group LV and the second arm reactor AR2.

The first internal AC bus ACB1 is also connected to a first end of a first transformer TR1, the second end of which may be connected to an AC system (not shown).

Here it can be seen that the upper converter valve group UV1 has a first DC side surge arrestor $SA_{DC1}$ connected between pole P1 and ground. It can also be seen that on both asides of the first transformer TR1 there are surge arrestors $SA_{TR1}$ and $SA_{TR2}$ connected to ground.

It can also be seen that the second converter 24 comprises an upper valve group UV2 and a lower valve group LV2, both realized through cascaded submodules. The lower valve group LV2 of the converter 24 is on the DC side connected to a negative DC pole bus 28, to which DC pole bus 28 the second poles $P2_1$ and $P2_2$ and $P2_n$ leading to the other converters are connected. In the given example only the poles $P2_1$ and $P2_2$ leading to the second sending station and the adjusted station are used although it is possible with n different connections.

The AC side of the upper valve group UV2 is, for each phase, connected to a third arm reactor AR3 via a third AC connection ACC3, which third arm reactor AR3 is in turn connected to a second internal AC bus ACB2. The AC side of the lower valve group LV2 is connected to a fourth arm reactor AR4 via a fourth AC connection ACC4, which fourth arm reactor AR4 is in turn also connected to the second internal AC bus ACB2.

For each phase, a third AC side surge arrestor $SA_{AC3}$ is connected between the third AC connection ACC3 and ground and a fourth AC side surge arrestor $SA_{AC4}$ is connected between the fourth AC connection ACC4 and ground, where the third AC side surge arrestor $SA_{AC3}$ is connected between the upper valve group UV2 and the third AC arm reactor AR3, while the fourth AC side surge arrestor $SA_{AC4}$ is connected between the lower valve group LV2 and the fourth arm reactor AR4.

The second internal AC bus ACB2 is also connected to a first end of a second transformer TR2, the second end of which may be connected to an AC system (not shown). It can also be seen that on both sides of the second transformer TR2 there are surge arrestors $SA_{TR3}$ and $SA_{TR4}$ connected to ground.

Here it can also be seen that the lower valve group LV2 has a second DC side surge arrestor $SA_{DC2}$ connected between pole P2 and ground.

Between the two converters 22 and 24 there is provided a neutral arrangement NA. The neutral arrangement NA comprises a group of neutral buses, which group comprises a first neutral bus NB1 that is connected to the first converter 22, a second neutral bus NB2 that is connected to the second converter 24 and a common neutral bus CNB that interconnects the first and second neutral buses NB1 and NB2. The common neutral bus CNB is thus connected to both the first and second neutral buses NB1 and NB2. The first neutral bus NB1 comprises a first neutral reactor R1 and the second neutral bus comprises a second neutral reactor R2. It can furthermore be seen that the neutral arrangement NA comprises a number of surge arrestors, each being connected between a neutral bus and ground. The group of neutral buses thereby comprises a first neutral bus NB1 connected to the first converter 22

It can more particularly be seen that the first neutral bus has NB1 may have three neutral bus surge arrestors $SA_{NB1}$, $SA_{NB2}$ and $SA_{NB3}$ connected between the first neutral bus NB1 and ground, where a first and a second surge arrestor $SA_{NB1}$ and $SA_{NB2}$ are connected to the first neutral bus NB1 between the first neutral reactor R1 and the lower valve group LV1, while a third surge arrestor $SA_{NB3}$ is connected to the first neutral bus NB1 after the first neutral reactor R1, i.e. between the first neutral reactor R1 and the common neutral bus CNB. It should be noted that there could be only two arrestors: one between a valve and reactor, and the other between reactor and line. For persons skilled in the art, it is understood, that there may be possible different arrestor arrangement depending on installation distance.

In a similar manner the second neutral bus NB2 has three neutral bus surge arrestors $SA_{NB4}$, $SA_{NB5}$ and $SA_{NB6}$ connected between the second neutral bus NB2 and ground, where a fourth and a fifth surge arrestor $SA_{NB4}$ and $SA_{NB5}$ are connected to the second neutral bus NB2 between the first neutral reactor R1 and the upper valve group UV2, while a sixth surge arrestor $SA_{NB6}$ is connected to the second neutral bus NB2 after the second neutral reactor R2, i.e. between the second neutral reactor R2 and the common neutral bus CNB.

The common bus CNB also has connections to neutral lines NL1, NL2, NLn corresponding to the first and second poles. In the given example only the neutral lines NIA and NL2 leading to the second sending station and the adjusted station are used although it is possible with n different connections. Each such neutral line is connected to the common bus CNB via a corresponding neutral line surge arrestor $SA_{NL2}$, $SA_{NL3}$ and $SA_{NLn}$, where theses surge arrestors are connected between the corresponding neutral line and ground. There is also a first earth switch ES1 connected between the first neutral line NIA and ground, a second earth switch ES2 connected between the second neutral line NL2 and ground an $n^{th}$ earth switch connected between the $n^{th}$ neutral line NLn and ground. It should here be realized that the number and placing of these earth switches is only exemplifying and that a number of different alternatives exist.

According to aspects of the invention there is proposed to use the large neutral bus reactors R1 and R2 of the neutral arrangement NB dividing the neutral arrangement into two different insulation zoom areas. As shown in FIG. 4, a line L1 divides the neutral bus/line area into a first high voltage insulation zoom (NZOOMH) and a second low voltage insulation zoom (NZOOML). Thereby the first insulation zoom area is separated from the second insulation zoom area via a reactor R1 in the first neutral bus NB1 as well as via a reactor in the second neutral bus NB1. In NZOOMH there is a first group of surge arrestors SAA for which the arrestor reference voltage may define a discharge voltage, for instance the SIPL, of this part of bus bar as high as for example 500 kV. In the example of FIG. 4 the surge arrestors in the first group are the first, second, fourth and fifth neutral bus surge arrestors $SA_{NB1}$, $SA_{NB2}$, $SA_{NB4}$ and $SA_{NB5}$. In NZOOML, there is a second group of surge arrestors SAB where the arrestor reference voltage may define the SIPL of this part of neutral arrangement as below 150 kV, for example 100 kV. In the example of FIG. 4, the surge arrestors in this second group are the third and sixth neutral bus surge arrestors $SA_{NB3}$ and $SA_{NB6}$ and the neutral line surge arrestors $SA_{NL1}$, $SA_{NL2}$ and $SA_{NLn}$. Thereby the reference voltage of the first group of surge arrestors is higher than the reference voltage of the second group of arrestors. The reference voltage of the first group of surge arrestors may define a discharge voltage that is at least two times higher, with advantage at least three times higher and preferably five times higher than the reference voltage of the second group of surge arrestors.

One observation that can be made is that the surge arrestors SAA in the first group are either connected to the first neutral bus NB1 or the second neutral bus NB2. They are thus only connected to one of these two buses. The surge arrestors in the second group may on the other hand be connected to these two neutral buses NB1 and NB2, but also to the common neutral bus CNB. At least one surge arrestor of the second group may thus be connected to the first neutral bus NB1 and at least one other surge arrestor of the second group may be connected to the second neutral bus NB2. At least some surge arrestors of the second group may thus be connected to the common neutral bus. Another observation that may be made is that the high voltage insulation zoom or first high voltage insulation area is provided closer to the converter than the low voltage insulation zoom or second low voltage insulation area. A further observation that can be made is that in the exemplifying embodiment of FIG. 4, at least one earth switch is provided in the low voltage insulation zoom area. However, other arrangements are possible according to other embodiments.

For the same type of critical fault as described in relation to FIGS. 2 and 3, the current rising rate will be significantly reduced due to large inductance, and the peak current can be also controlled to the safe range.

Figure 6:
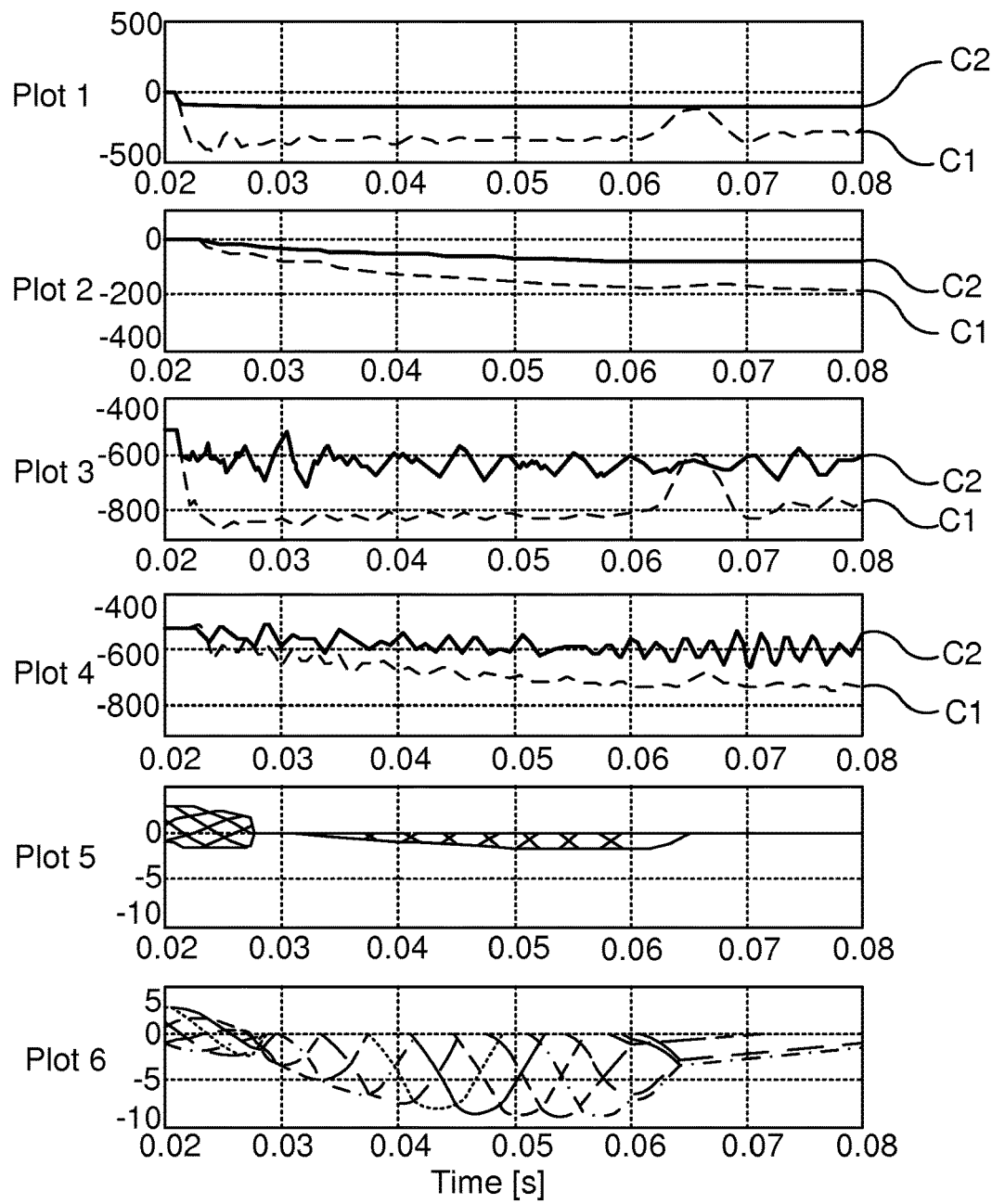
FIG. 6 shows a transient during a pole to ground fault, where Plot1 shows voltage measured at neutral bus to ground (curve C1: prior solution; curve C2: new solution) at the receiving station, Plot2 shows voltage measured at neutral bus to ground (curve C1: prior solution; green curve C2: new solution) at a first sending station, Plot3 shows voltage measured at pole bus to ground (curve C1: prior solution; curve C2: new solution) at the receiving station, Plot4 shows voltage measured at pole bus to ground (curve C1: prior solution; curve C2: new solution) at the first sending station, Plot5 shows arm current prior solution and Plot6 shows arm current new solution.

In order to illustrate the impact of the solution, FIG. 6 shows one pole to ground fault when one line is out of operation, which makes the meshed grid to a radial configuration. Due to large impedance and current in the metallic return path, the neutral bus voltage may rise to above 400 kV for a few tenth of milliseconds (ms). With the proposed solution, the neutral arrangement is limited to below 100 kV as can be seen in the FIG. 6, plot 1 and plot 2, solid curve C2. The other positive impact is obvious: the un-faulted pole to ground voltage is significantly reduced, refer to plot 3 and 4, solid curve C2. The down side is the arms current are increased comparing plot 6 with plot 5, but they are still below the valve capability.

Figure 7:
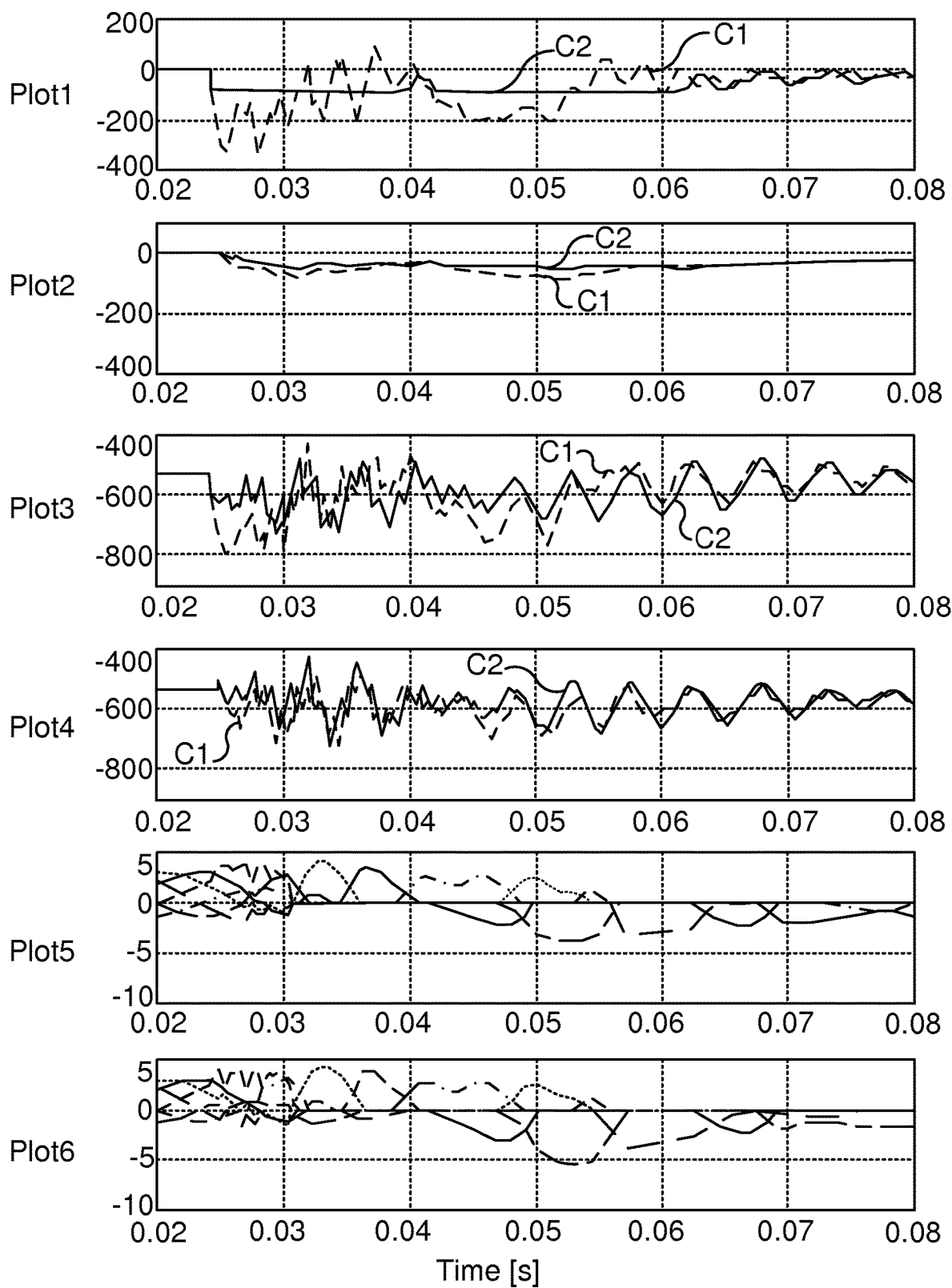
FIG. 7 shows a transient during converter bus phase to ground faults, where Plot1 shows voltage measured at neutral bus to ground (curve C1: prior solution; curve C2: new solution) at the receiving station, Plot2: shows voltage measured at neutral bus to ground (curve C1: prior solution; curve C2: new solution) at the first sending station, Plot3 shows voltage measured at pole bus to ground (curve C1: prior solution; curve C2: new solution) at the receiving station, Plot4 shows voltage measured at pole bus to ground (curve C1: prior solution; curve C2: new solution) at the first sending station, Plot5 shows arm current prior solution and Plot6 shows arm current new solution.

FIG. 7 shows one phase to ground fault between a converter and transformer. With the proposed solution, the neutral bus is limited to below 100 kV as can be seen in the FIG. 7, plot 1 solid curve C2. The other positive impact can be also seen: the un-faulted pole to ground peak voltage is reduced, refer to plot 3 and 4, solid curve C2. In this case the arm currents are not affected comparing plot 6 with plot 5.

The proposed solution will reduce the cost of all equipment on the neutral line/bus between the neutral reactors and including neutral reactors of two converter stations, For instance, the terminal voltage switching withstand level of the neutral reactor may be reduced from 1300 kV to below 750 kV, which will significantly reduce the cost of the reactor. Another example, some earth switches, such as the earth switches ES1, ES2 and ES3 in the low voltage insulation zoom area, may be reduced from 650 kV to 115 kV. It will also save the space due to reduced voltage and enhance the safety along the corridor for neutral pole line and neutral line.

The present invention can be varied in a multitude of ways. It should for instance be known that SIPL is only one type of discharge voltage that may be used for the dimensioning. The invention may also be possible to apply in asymmetric monopole systems, in which case there is no second converter and no second neutral bus. It should also be realized that it is possible that the neutral arrangement comprises a number of further elements such as circuit breakers and further grounding or earth switches, The number of surge arrestors are also only exemplifying. The converter station being exemplified with having the neutral arrangement was the receiving converter station. It should however be realized that any of the other converter stations of the DC system may also be provided with a neutral arrangement. The described system was also a multi-terminal system. It should be realized that it may just as well be a point-to-point system.

It shall consequently be realized that the present invention is only to be limited by the following claims.

The invention claimed is:

1. A neutral arrangement for a converter station of a direct current power transmission system comprising a first converter, the neutral arrangement comprising:
   a plurality of surge arrestors;
   a group of neutral buses, wherein each surge arrestor is connected between an associated neutral bus of the group and ground;
   wherein the neutral arrangement includes a high voltage insulation zoom area comprising a first group of surge arrestors and a low voltage insulation zoom area comprising a second group of surge arrestors; and
   wherein the surge arrestors in the first group have a first arrestor reference voltage and the surge arrestors in the second group have a second arrestor reference voltage that is lower than the first arrestor reference voltage.

2. The neutral arrangement according to claim 1, wherein the group of neutral buses comprises a first neutral bus to be connected to the first converter and surge arrestors of the first group are connected to the first neutral bus.

3. The neutral arrangement according to claim 2, wherein the direct current power transmission system is a bipolar direct current power transmission system, the converter station comprises a second converter connected to a second pole of the direct current power transmission system and the group of neutral buses comprises a second neutral bus to be connected to the second converter, wherein the first group of surge arrestors comprises surge arrestors connected between the second neutral bus and ground.

4. The neutral arrangement according to claim 3, further comprising a reactor in the second neutral bus, wherein the high voltage insulation area is separated from the low voltage insulation area via the reactor.

5. The neutral arrangement according to claim 3, wherein at least one surge arrestor of the second group is connected to the second neutral bus.

6. The neutral arrangement according to claim 3, wherein the group of neutral buses comprises a common neutral bus that is connected to both the first and second neutral buses and at least some surge arrestors of the second group are connected to the common neutral bus.

7. The neutral arrangement according to claim 2, further comprising a reactor in the first neutral bus, wherein the high voltage insulation area is separated from the low voltage insulation area of the neutral arrangement by the reactor.

8. The neutral arrangement according to claim 2, wherein at least one surge arrestor of the second group is connected to the first neutral bus.

9. The neutral arrangement according claim 1, wherein the first arrestor reference voltage of the first group of surge arrestors defines a discharge voltage that is at least two times higher than the second arrestor reference voltage of the second group of surge arrestors.

10. The neutral arrangement according claim 9, wherein the first arrestor reference voltage of the first group of surge arrestors defines a discharge voltage that is at least three times higher than the second arrestor reference voltage of the second group of surge arrestors.

11. The neutral arrangement according claim 10, wherein the first arrestor reference voltage of the first group of surge arrestors defines a discharge voltage that is at least five times higher than the second arrestor reference voltage of the second group of surge arrestors.

12. The neutral arrangement according to claim 1, wherein the first arrestor reference voltage defines a first discharge voltage and the second arrestor reference voltage defines a second discharge voltage.

13. The neutral arrangement according to claim 1, wherein the first arrestor reference voltage defines a first a switching impulse level (SIPL) voltage and the second arrestor reference voltage defines a second SIPL discharge voltage.

14. The neutral arrangement according claim 1, further comprising a ground switch in the low voltage insulation zoom area.

15. A converter station for a direct current power transmission system, the converter station comprising:
   a first converter;
   a high voltage insulation zoom area comprising a first group of surge arrestors, wherein the surge arrestors in the first group have a first arrestor reference voltage;
   a low voltage insulation zoom area comprising a second group of surge arrestors, wherein the surge arrestors in the second group have a second arrestor reference voltage that is lower than the first arrestor reference voltage; and
   a neutral bus coupled to the first converter, wherein each surge arrestor is connected between the neutral bus of the group and ground.

16. The converter station according to claim 15, further comprising a reactor in the neutral bus, wherein the high voltage insulation area is separated from the low voltage insulation area of by the reactor.

17. The converter station according to claim 15, wherein the first arrestor reference voltage of the first group of surge arrestors defines a discharge voltage that is at least three times higher than the second arrestor reference voltage of the second group of surge arrestors.

18. A bipolar direct current power transmission system comprising:
   a first converter coupled to a first pole of the bipolar direct current power transmission system;
   a second converter coupled to a second pole of the bipolar direct current power transmission system;
   a first neutral bus coupled to the first converter;
   a second neutral bus coupled to the second converter;
   a high voltage insulation zoom area comprising a first group of surge arrestors, each of the surge arrestors in the first group coupled between either the first neutral bus and ground or the second neutral bus and ground, wherein the surge arrestors in the first group have a first arrestor reference voltage; and
   a low voltage insulation zoom area comprising a second group of surge arrestors, a first surge arrestor of the second group being coupled between the first neutral bus and ground and a second surge arrestor of the second group being coupled between the second neutral bus and ground, wherein the surge arrestors in the second group have a second arrestor reference voltage that is lower than the first arrestor reference voltage.

19. The system according to claim 18, further comprising a first reactor in the first neutral bus and a second reactor in the second neutral bus, wherein the high voltage insulation area is separated from the low voltage insulation area by the first and second reactor.

20. The system according to claim 18, further comprising a common neutral bus that is connected to both the first and second neutral buses, wherein additional surge arrestors of the second group are connected to the common neutral bus.

21. The system according to claim 20, further comprising a ground switch coupled between the common neutral bus and ground.

\* \* \* \* \*